Jan. 26, 1954     F. J. SOWA     2,667,403
METHOD OF PRODUCING MONOAMMINO BORON TRIFLUORIDE
Filed Jan. 16, 1951
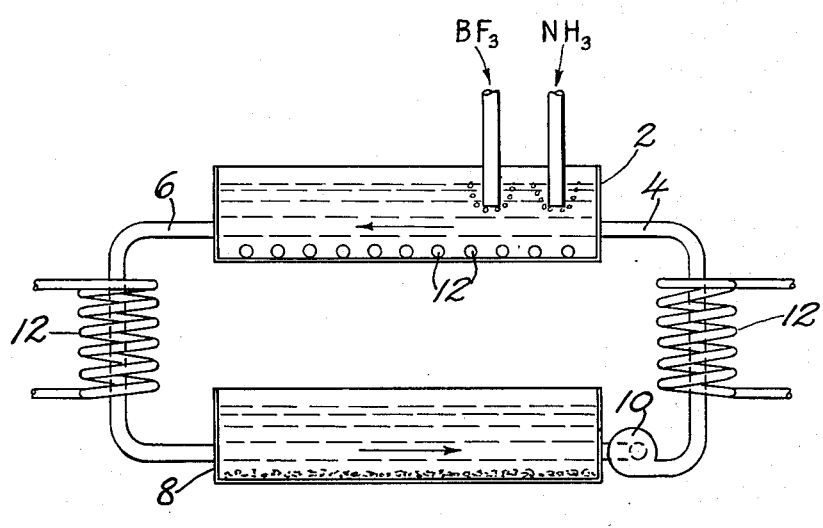
INVENTOR.
FRANK J. SOWA
BY
*Albert Sperry*
ATTORNEY Patented Jan. 26, 1954

2,667,403

UNITED STATES PATENT OFFICE 2,667,403

METHOD OF PRODUCING MONOAMMINO BORON TRIFLUORIDE

Frank J. Sowa, Cranford, N. J.

Application January 16, 1951, Serial No. 206,174

10 Claims. (Cl. 23—88)

This invention relates to methods of producing monoammino boron trifluoride and is directed particularly to methods wherein reactions are conducted in a liquid medium.

It has been pointed out heretofore that monoammino boron trifluoride can be produced by direct reaction between anhydrous ammonia gas and boron trifluoride gas. When these gases are introduced into a reaction chamber combination takes place immediately, but it is highly exothermic and results in the formation of a white powdery product. As shown by Laubergayer and Condike, J. Am. Chem. Soc. 70, 2274 (1948), the heat of reaction is 41.3 kilogram calories per mol of the solid monoammino boron trifluoride formed. The extremely high temperatures thus generated are detrimental to the reaction since they give rise to side reactions and decomposition which apparently result in the formation of ammonium fluoroborate and boron nitride according to the equation

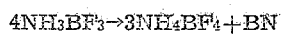

Such decomposition reactions are appreciable at temperatures of 125° C. and take place rapidly at 150° C. Accordingly, in the commercial production of monoammino boron trifluoride considerable quantities may be lost in the vapor phase reaction of gaseous ammonia with gaseous boron trifluoride, as insoluble boron nitride and ammonium fluoborate. Such decomposition cannot readily be avoided in carrying out the reaction in a vapor phase since it is difficult to cool gaseous reactants and is even more difficult to cool the resulting solid reaction product while it is suspended or even when it collects on surfaces within the reaction chamber.

Early investigators report that when boron trifluoride is passed into water, fluoboric acid, boric acid and other boron fluoride decomposition products occur. These reactions are irreversible under ordinary conditions and the resulting products are totally unsuitable for use in preparing monoammino boron trifluoride. However, I have discovered that monoammino boron trifluoride can be formed in practically theoretical yield by passing boron trifluoride into an ammoniacal aqueous solution and thus eliminate undesirable by-products. Furthermore, when so formed the temperature of the reaction can be effectively controlled and decomposition avoided. Moreover, the product obtained is not a "white powder" such as that produced by vapor phase reaction but instead is in the form of plate-like crystals such as those which Laubergayer and Condike obtained by recrystallization. In this way a quantitative yield of a crystalline product can be obtained and the purity of the product is improved.

One of the objects of the present invention is to provide a novel method for the production of monoammino boron trifluoride.

Another object of the invention is to provide a method whereby monoammino boron trifluoride of high purity can be obtained.

A further object of the invention is to provide methods whereby substantially quantitative yields of monoammino boron trifluoride can be obtained.

These and other objects and features of the invention will appear from the following description thereof in which reference is made to specific methods of operation for the purpose of indicating the nature of the invention, but without intending to limit the invention thereby.

The figure of the drawing is a diagrammatic illustration of a typical installation for use in carrying out the present invention as a continuous operation.

The concentration of the ammonium hydroxide can be varied considerably but it is preferable to maintain a reaction bath that is continuously ammoniacal in order to avoid reaction between the boron trifluoride and water to form the dihydrate. Moreover, monoammino boron trifluoride is considerably less soluble in concentrated ammonium hydroxide than in water so that less of the product remains in solution when the ammonium hydroxide concentration is maintained relatively high. Therefore the concentration of the ammonium hydroxide is preferably kept above about 2% and may be as high as 35%. Ordinarily a concentration of about 28% ammonium hydroxide, corresponding to 14% $NH_3$, is found most suitable. The reactions which take place may be expressed by the following equations

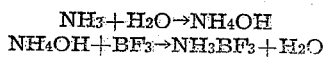

The reaction mixture is preferably cooled by a water bath or otherwise since the reaction is still exothermic although the temperature can be controlled much more readily than when carried out with a vapor phase reaction. The relatively high specific heat of the water and ammonium hydroxide further facilitates control of the reaction temperatures.

*Example I*

In a typical case 2000 grams of 28% $NH_4OH$ was weighed out in a 5 liter flask equipped with a mechanical stirrer and inlet tube. Gaseous BF₃ was allowed to bubble into the NH₄OH while the whole was stirred and cooled in a water bath. In two hours a total of 949 grams of BF₃ was absorbed (14 mols). The flask was then allowed to stand for two hours and white crystals precipitated. These were filtered, washed with isopropyl alcohol and then dried. A total of 1180 grams of product was obtained or a 14 mol yield.

*Example II*

Gaseous ammonia is bubbled into water until a 24% solution of NH₄ is obtained (12% NH₃). Thereafter the addition of ammonia is continued and boron trifluoride is bubbled into the solution, the further additions of ammonia and boron trifluoride being in approximately molar proportions. These proportions may be varied but it is preferable to maintain a molar excess of ammonium hydroxide as represented by a continuing concentration of not less than about 2% of ammonium hydroxide in the reaction mixture.

The reaction may be continued as long as desired, provided additional ammonia is introduced to maintain the desired alkalinity. When concluded the alkaline solution is filtered and the monoammino boron trifluoride is separated in the form of flat, angular crystalline plates. The yield is theoretical.

For industrial production the reaction is preferably carried on continuously and as shown diagrammatically in the drawing, a reaction chamber 2 is provided with an inlet conduit 4 and an outlet conduit 6. The outlet conduit extends to a crystal filtering chamber 8 in which any suitable or preferred form of crystal removing means are employed. The chamber 8 may simply be a settling chamber from which the precipitated crystals are removed continuously or from time to time or it may be a centrifuge or filter press, for example. The liquid is circulated by means of a pump 10, the intake side of which is connected with the crystal filtering chamber 8 and the outlet side of which discharges to the inlet conduit 4 of the reaction chamber 2. If desired brine coils 12 may be located in the reaction chamber 2 and in heat exchanging relation with the inlet and outlet conduits 4 and 6. The product is preferably dried at a temperature of about 100° C. or lower.

In initiating the operation the system is charged with water and ammonia is introduced through the inlet 14 so as to be absorbed by the circulated water in the system until ammonium hydroxide of the desired concentration is produced. Thereafter the introduction of ammonia is continued and boron trifluoride is introduced through the inlet 16. The inlet 14 for the ammonia may be placed directly in advance of the inlet 16 for the boron trifluoride so that liquid circulated through the system will flow in a direction to carry the ammonia as ammonium hydroxide directly to the boron trifluoride inlet. The liquid is circulated and reaction takes place in chamber 2. The reaction product consisting of monoammino boron trifluoride is carried through the outlet conduit 6 to the crystal filtering chamber 8 where the reaction product is removed. The filtered liquor is drawn off by the pump 10 and returned to the reaction chamber 2 where it is again charged with ammonia to maintain the desired concentration of ammonium hydroxide in the system and particularly at the point of entry of the boron trifluoride.

The reaction may be continued as long as desired and the yield will be substantially theoretical. The temperature of the reaction bath is preferably kept relatively low, that is below about 50° C., in order to avoid loss of ammonia from the system. However, the yield does not appear to be materially affected by variations in temperature within the practical operating range of the system described.

If the temperature of the reaction mixture is kept below room temperature, say around from 0 to 20° C., the concentration of the ammonium hydroxide can be reduced. In fact with such low temperatures it is possible to introduce the boron trifluoride prior to the introduction of ammonia. In such cases the boron trifluoride is absorbed by the water and boron fluoride hydrate is formed as the mono hydrate and the dihydrate, but there is little or no tendency to form other undesired side reaction products. The ammonia can then be introduced into the boron fluoride hydrate solution either in the form of ammonia gas or as a solution of ammonium hydroxide even though the system is not maintained ammoniacal. The reaction taking place under such conditions may be expressed by the following equations

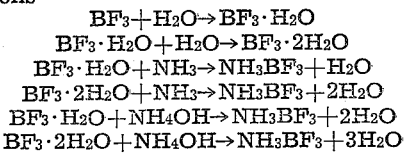

$$BF_3 + H_2O \rightarrow BF_3 \cdot H_2O$$
$$BF_3 \cdot H_2O + H_2O \rightarrow BF_3 \cdot 2H_2O$$
$$BF_3 \cdot H_2O + NH_3 \rightarrow NH_3BF_3 + H_2O$$
$$BF_3 \cdot 2H_2O + NH_3 \rightarrow NH_3BF_3 + 2H_2O$$
$$BF_3 \cdot H_2O + NH_4OH \rightarrow NH_3BF_3 + 2H_2O$$
$$BF_3 \cdot 2H_2O + NH_4OH \rightarrow NH_3BF_3 + 3H_2O$$

Care should be used to avoid local overheating of the reaction mixture since those side reactions which occur between boron trifluoride and water are not generally reversible in the presence of ammonia and the product therefore is not generally as pure or so nearly quantitative in its yield.

The present invention may be used to recover boron fluoride from an aqueous medium in the form of monoammino boron trifluoride in processes wherein boron trifluoride or its hydrate is used as a catalyst. Thus, for example, when alkylation, polymerization or condensation products obtained by the use of a boron fluoride catalyst are washed with water the major portion of the catalyst will be lost to the wash water. However, by the addition of ammonia to such wash waters in accordance with the present invention monoammino boron trifluoride is produced and recovered for use by itself or for regenerating the catalyst.

The methods described above are typical of those which may be employed in the practice of my invention but they are capable of various modifications with respect to the concentration of the ammonium hydroxide and the rate of introduction of the gaseous reactants into the liquid medium. In view thereof it should be understood that the steps of the process and the conditions of reaction may be varied considerably without departing from the spirit and scope of the invention and are not limited to the specific examples set forth above.

I claim:

1. The method of producing monoammino boron trifluoride which comprises the step of bringing boron trifluoride and ammonia into reaction contact in an aqueous liquid using sufficient ammonia to render the liquid ammoniacal, maintaining the temperature of the liquid below about 50° C. and separating the resulting product from said liquid.

2. The method of producing monoammino boron trifluoride which comprises the step of introducing boron trifluoride into an aqueous solution of ammonia, maintaining the temperature of the solution below about 50° C., and separating the resulting product from the solution.

3. The method of producing monoammino boron trifluoride which comprises the step of introducing boron trifluoride into an aqueous solution of ammonia, maintaining the temperature of the solution below about 50° C., maintaining the solution ammoniacal by addition of ammonia thereto during the operation, and separating the resulting product from the solution.

4. The method of producing monoammino boron trifluoride which comprises the steps of introducing gaseous ammonia and boron trifluoride into an aqueous liquid using sufficient ammonia to render the liquid ammoniacal, maintaining the temperature of the liquid below about 50° C. and separating the resulting product from said liquid.

5. The method of producing monoammino boron trifluoride which comprises the steps of successively introducing gaseous ammonia and boron trifluoride into an aqueous liquid using sufficient ammonia to render the liquid ammoniacal, maintaining the temperature of the liquid between about 20° C. and 50° C., and separating the resulting product from said liquid.

6. The method of producing monoammino boron trifluoride which comprises the steps of simultaneously introducing gaseous ammonia and boron trifluoride into an aqueous liquid using sufficient ammonia to render the liquid ammoniacal, maintaining the temperature of said liquid between about 20° C. and 50° C., and separating the resulting product from said liquid.

7. The method of producing monoammino boron trifluoride which comprises circulating an ammoniacal aqueous liquid through a reaction chamber to a filtering means and back to the reaction chamber, and simultaneously introducing gaseous ammonia and boron trifluoride into the aqueous liquid in the reaction chamber while maintaining said liquid at a temperature above about 20° C. and below about 50° C.

8. The method of producing monoammino boron trifluoride which comprises circulating an ammoniacal aqueous liquid through a reaction chamber to a filtering means and back to the reaction chamber, and simultaneously introducing gaseous ammonia and boron trifluoride into the aqueous liquid in the reaction chamber while maintaining the liquid ammoniacal and at a temperature below about 50° C.

9. The method of producing monoammino boron trifluoride which comprises the steps of dissolving boron trifluoride in water maintained at a temperature below about 20° C., introducing ammonia into the resulting solution, and separating the resulting product from the solution.

10. The method of recovering boron trifluoride from an aqueous solution containing the same which comprises the steps of bringing ammonia into reaction contact with said solution in amount sufficient to render the solution ammoniacal, separating the monoammino boron trifluoride produced from said solution and regenerating boron trifluoride from the separated product.

FRANK J. SOWA.

References Cited in the file of this patent

J. Am. Chem. Soc. 70, 2274 (1948).

"Boron Trifluoride and Its Derivatives," by H. S. Booth and D. R. Madin, 1949 ed., pages 43 and 44; John Wiley and Sons, Inc., N. Y.

"Inorganic Chemistry," 2nd ed., 1931, by T. M. Lowry, page 598. The MacMillan and Co., Ltd., London, publisher.

J. A. C. S., vol. 51 (1929), page 2692.

J. W. Mellor's "A Comprehensive Treatise on Inorganic and Theoretical Chemistry," vol. 8, page 194; Longmans, Green and Co., N. Y.; and vol. 5, page 122 (1924 ed.).